(12) United States Patent
Schneider

(10) Patent No.: US 8,448,531 B2
(45) Date of Patent: May 28, 2013

(54) COMPRESSIVE FORCE MEASUREMENT DEVICE

(75) Inventor: Hans-Walter Schneider, Ebsdorfergrund (DE)

(73) Assignee: medi GmbH & Co. KG, Bayreuth (DE)

( * ) Notice: Subject to any disclaimer, the term of this patent is extended or adjusted under 35 U.S.C. 154(b) by 382 days.

(21) Appl. No.: 13/012,871

(22) Filed: Jan. 25, 2011

(65) Prior Publication Data

US 2011/0179886 A1 Jul. 28, 2011

(30) Foreign Application Priority Data

Jan. 25, 2010 (DE) .......................... 10 2010 005 792

(51) Int. Cl.
*G01L 1/04* (2006.01)

(52) U.S. Cl.
USPC ..................................................... 73/862.641

(58) Field of Classification Search
USPC ..................................................... 73/862.641
See application file for complete search history.

(56) References Cited

U.S. PATENT DOCUMENTS

| | | | | |
|---|---|---|---|---|
| 3,825,804 A * | 7/1974 | Amelunxen | .................. | 257/727 |
| 3,894,595 A * | 7/1975 | Czyryk | .......................... | 177/256 |
| 4,122,337 A * | 10/1978 | Okuda et al. | ............. | 250/231.19 |
| 4,383,584 A * | 5/1983 | Dyck | ............................ | 177/208 |
| 4,712,627 A * | 12/1987 | Harrington et al. | ............. | 177/50 |
| 5,900,592 A * | 5/1999 | Sohns et al. | ............. | 177/210 R |
| 6,515,650 B2 * | 2/2003 | Arita et al. | .................... | 345/156 |
| 7,234,359 B2 * | 6/2007 | Hirose et al. | .................... | 73/777 |
| 7,504,594 B1 * | 3/2009 | Ruth et al. | .................... | 177/128 |

OTHER PUBLICATIONS

Sensortechnics, "RFU Series. Low profile force sensor", 3 pages, <http://www.repcomsrl.com/contenuti/focus/RFU_E_11710-B.pdf>.

* cited by examiner

*Primary Examiner* — Lisa Caputo
*Assistant Examiner* — Octavia D. Hollington
(74) *Attorney, Agent, or Firm* — Senniger Powers LLP

(57) ABSTRACT

A compressive force measurement device with a pressure-/voltage converter in chip technology features a spherical segment-shaped sensor area. The pressure-/voltage converter is disposed between one base disc and one cover disc, wherein the base disc and the cover disc are tensioned against one another by means of springs with essentially identical pulling force. Forces acting on the cover disc have the effect that the cover disc always positions itself perpendicularly to the direction of force, whereby some of the springs are additionally loaded and others are relieved and thereby a compensation of forces takes place that act obliquely on the compressive force measurement device.

16 Claims, 2 Drawing Sheets

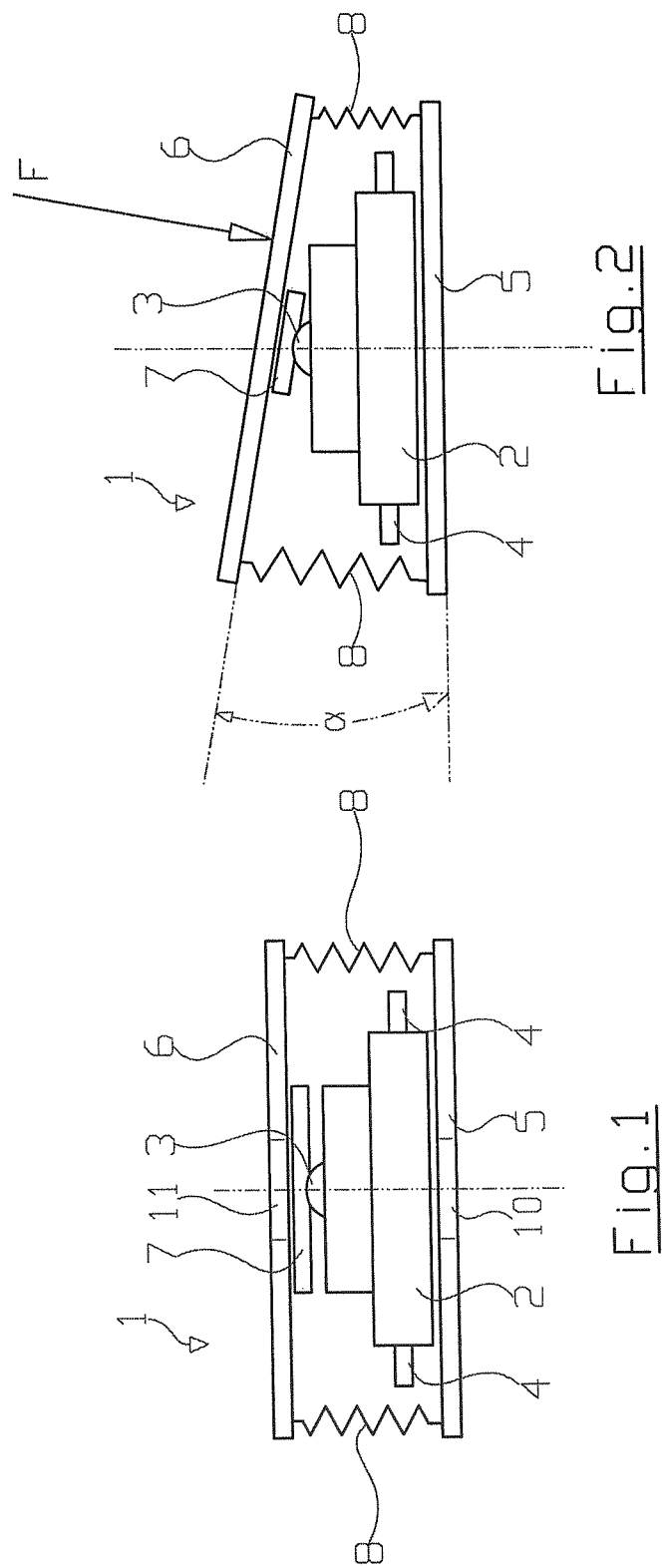

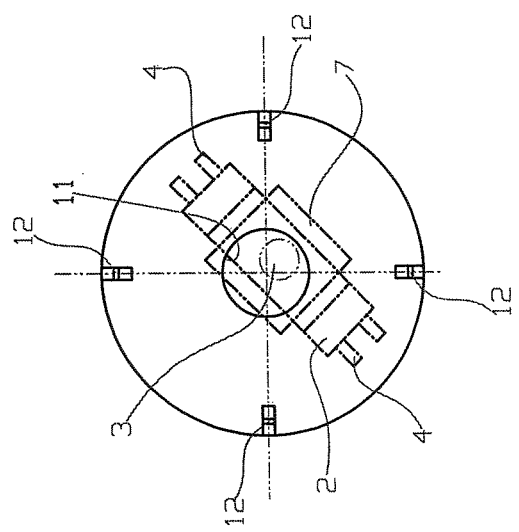
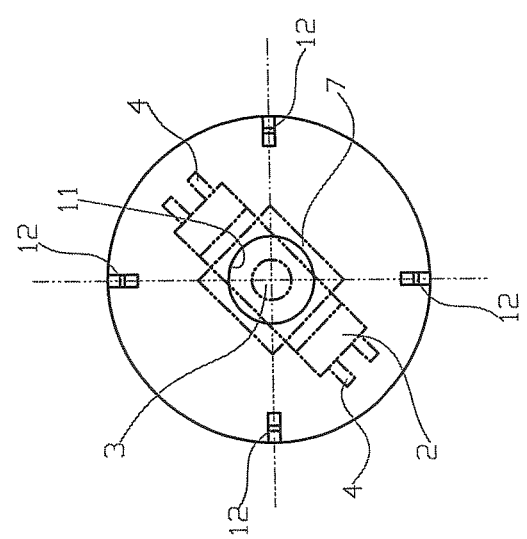
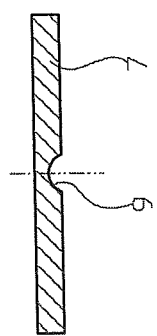

COMPRESSIVE FORCE MEASUREMENT DEVICE

REFERENCE TO RELATED APPLICATIONS

This application claims priority to German application DE 10 2010 005 792.4 filed Jan. 25, 2010, the entire disclosure of which is incorporated by reference.

FIELD OF THE INVENTION

The invention concerns a compressive force measurement device with a pressure-/voltage converter in chip technology.

BACKGROUND OF THE INVENTION

Pressure measurement devices based on pressure-/voltage converter in chip technology are known for example because of a compressive force sensor by the company Sensortechnics GmbH, Boschstraße 10, 82178 Puchheim under the device label RFU-E-11710.

The measurement of forces and pressures is necessary in different areas of technology.

A special area, for which the invention is preferably designed, is medical technology, and in that context the measurement of the pressure that arises on the skin of a patient during the application of a bandage that is applied, for example, during lymphatic therapy.

During lymphatic therapy on one leg of a patient one pressure bandage is applied that has to be wrapped in such a manner that the pressure decreases from the foot end in the direction toward the knee or upper thigh. The same applies for pressure bandages on the arm. The medical personnel that apply such bandages are trained for this purpose on models, wherein the respective pressure is measured at different locations.

For that purpose until now pneumatic pressure transducers with balloon-like plastic bags were utilized, attached to which was, for the purpose of the pressure measurement, a connecting hose to a baric measuring device. Besides the fact that such balloon-like plastic bags and connecting hoses leading to a baric measuring device are unwieldy because of their construction size, the measurement accuracy is also, because of different fill volumes of the plastic bags that are filled with air, less than desirable.

It is therefore attractive to utilize more modern pressure/voltage converters in chip technology that today deliver very accurate and simple to evaluate electrical signals while featuring a very small size (for example foot print <10 mm$^2$ and height <4 mm)

One problem is however that such pressure-/voltage converters in chip technology only register forces that act perpendicularly to a sensor area, which for many application areas is not sufficient, for example for the measurement requirements in the context of the lymph drainage described above. The textile bandages feature, in the context of the lymph drainage, in the tensioned state hole-like depressions between the web threads so that the very small sensor measurement surface, which is spherical segment-shaped, can be located in such a depression and would therefore detect a falsely-low pressure.

Similar problems also arise in the case of the evaluation of compressive forces with wheel chairs, chairs, car seats, operating beds, and hospital beds, where for example the stress on back, bottom, legs, arms etc. of a person is to be measured, wherein the forces acting on the pressure-/voltage converter are pointed in different directions. The perpendicular components of these forces also are to be measured in a reliable manner.

SUMMARY OF THE INVENTION

It is therefore the object of the invention to create a compressive force measurement device with a pressure-/voltage converter in chip technology that encompasses a measurement surface that measures all perpendicular force components that act from different directions on the sensor.

The problem is solved according to the characteristics indicated in patent claim 1. Advantageous embodiments and improvements of the invention can be deduced from the sub-claims.

The invention proceeds from the assumption of a pressure-/voltage converter in chip technology that features a spherical segment-shaped sensor area. For the solution of the problem stated above the invention proposes that a pressure-/voltage converter is disposed between a base disc and a cover disc. The base disc and the cover disc are tensioned against one another by means of springs. A pretensioning force acts thereby on the pressure-/voltage converter. Between the pressure-/voltage converter and the cover disc is an adjustment disc disposed that features a depression that is adapted to the spherical segment-shaped sensor area and with which the sensor area is in contact. The cover disc can therefore be tilted about the center of the circle of the spherical segment-shaped sensor area in arbitrary directions and arranges itself thereby, even in the case of forces acting eccentrically on the cover disc, always perpendicularly to the affecting force. In the process some of the springs are relieved and others loaded so that deviations of arising forces are compensated by the small measurement surface of the sensor. The pressure-/voltage converter is as a result able to measure all perpendicular forces that arise perpendicularly to the spherical segment-shaped sensor area and not only those force components that arise directly perpendicularly to the sectional plane of the spherical segment.

Since the springs between base disc and cover disc are subject to manufacturing tolerances, it has to be assured that the pressure-/voltage converter is disposed between the two discs in such a manner that all springs are exactly equally loaded. According to an improvement of the invention it is therefore provided that the adjustment disc and the pressure-/voltage converter are displaceable relative to the base disc and to the cover disc.

In order to be able to implement this by simple means, the cover disc and the base disc respectively feature an opening through which the displacement with a tool is possible.

After a calibration, meaning an alignment of adjustment disc and pressure-/voltage converter in such a manner that all springs are loaded equally, the adjustment disc is attached to the cover disc and the pressure-/voltage converter is attached to the base disc, for example by means of adhesion.

The springs between cover disc and base disc are disposed respectively in the outer edge area of these discs, wherein at least three springs are present. Preferred however are four springs. A larger number of springs is also possible. The springs are disposed in a distributed manner in equidistant spacings around the edge of base- and cover disc.

By preselecting the force of the springs, different pre-loads can be exerted on the pressure-/voltage converter.

Electrical connections of the pressure-/voltage converter can be guided outward in a downward direction by means of wire connections laterally or through additional openings in the base plate.

If the electrical connections of the pressure-/voltage converter are guided outward in a downward direction through one or several bore holes, then said connections can be fixated in a holding means, which encompasses the base plate, by means of adhesion, bayonet catch, screw connection, or compression.

BRIEF DESCRIPTION OF THE DRAWINGS

In what follows the invention is explained in more detail based on an embodiment example in connection with the drawing. It is shown:

FIG. 1, a schematic side view of a compressive force measurement device according to one embodiment example of the invention;

FIG. 2, a side view of the compressive force measurement device, similar to FIG. 1 in the case of forces acting at an angle;

FIG. 3, the plan view of the compressive force measurement device of FIG. 1;

FIG. 4, a plan view onto the cover disc of the compressive force measurement device with an adjustment disc that was displaced toward the right and downward;

FIG. 5, a cross section of the adjustment disc utilized in the context of the invention.

DETAILED DESCRIPTION OF PREFERRED EMBODIMENTS

The compressive force measurement device, which is labeled in its entirety with the reference symbol 1, has a pressure-/voltage converter 2 in chip technology that features a spherical segment-shaped sensor area 3. A mechanical compressive force F that acts on this sensor area 3 is converted by the pressure-/voltage converter into an electrical output signal that is proportional to the force F that acts on the sensor area, wherein this electrical signal is outputted via electrical connections 4 and transmitted via electrical lines that are not represented to a display- or evaluation device that is not represented.

The pressure-/voltage converter 2 is disposed between one base disc 5 and one cover disc 6, wherein these two discs 5 and 6 are tensioned against one another by means of several springs 8. The springs 4 are therefore tension springs by means of which a pre-load is applied to the sensor area 3.

Between the pressure-/voltage converter 2 and the cover disc 6 is also an adjustment disc 7 disposed that features a spherical segment-shaped recess 9 that is adapted to the spherical segment-shaped sensor area 3. The adjustment disc 7 is disposed in such a manner that the sensor area 3 engages the recess 9. Due to the spherical segment shape of the sensor area 3 and the recess 9 the cover disc 6 can therefore be tilted or oscillate relative to the pressure-/voltage converter 2 and relative to the base disc 5, as is represented in FIG. 2. The possible tilt angle α is limited by the geometry of the sensor area and the adjustment disc, because one edge of the adjustment disc 7 abuts against the upper side of the pressure-/voltage converter 2 or the base disc 5.

In a practical embodiment example the adjustment disc features a thickness of 0.5 mm and a longitudinal extend of 7.0 mm. The cover disc and the base disc have respectively a thickness of 0.8 mm. The entire height, from the bottom side of the base disc to the upper side of the cover disc, amounts to 5.68 mm. By these means approximate tilt angles of 20° can be realized, which for the application areas in medical technology as stated at the beginning is sufficient. Through corresponding dimensioning of the individual elements larger tilt angles can however also be realized.

From FIG. 3 is can be discerned that in the embodiment example four springs are disposed in equidistant spacings around the outer area of the cover disc 6 and the base disc 5, wherein the springs are hooked into attachment openings 12 of these two discs 5 and 6.

Since in practice the springs 8 are not exactly equal because of manufacturing tolerances, an adjustment has to be performed which is implemented in that the pressure-/voltage converter 2, together with the adjustment disc 7, is displaced relative to the base disc 5 and to the cover disc 6, the process of which is represented in FIG. 4. The compressive force measurement device is adjusted when all springs exert the same force so that the base disc 5 and the cover disc 6 are positioned exactly parallel to one another.

In order to implement this adjustment in a simple manner, the base disc 5 has an approximately centered opening 10 and the cover disc 6 an approximately centered opening 11, wherein the diameter of the opening 11 is smaller than the adjustment disc 7 so that the adjustment disc 7 is always in contact with the underside, which points to the pressure-/voltage converter 2, of the cover disc. The displacement and therefore adjustment can be performed through the two openings 10 and 11, wherein after the complete adjustment the pressure-/voltage converter 2 is firmly connected with the base disc 5, for example by means of adhesion, and likewise the adjustment disc 7 with the cover disc 6.

FIG. 5 presents a cut through the adjustment disc 7 where the spherical segment-shaped recess 9 is clearly recognizable. The adjustment disc 7 can be circular-shaped in a plan view. It can however also be rectangular or have another arbitrary shape, as indicated in FIGS. 3 and 4.

By means of the selection of the springs 8 the pre-load that is exerted on the pressure-/voltage converter 2 can also be adjusted.

Due to the adjustment described above the position of the pressure-/voltage converter is displaced in such a manner that the pressure-/voltage converter, after the application of respectively the same force to all points of the cover disc 6, registers respectively the same force. As represented in FIG. 2, a force F that is acting eccentrically on the cover disc 6 effects a pivoting or tilting of the cover disc by the tilt angle α, whereby the left spring 8 represented in FIG. 2 is further tensioned and therefore exerts a larger force, while the right spring 8 represented in FIG. 2 is compressed and thereby relieved. Depending on the offset between force engagement point and center axis 13 the leverage arm between the force engagement point and the rotational center is of different length and correspondingly the forces exerted by the corresponding springs are also of different size, so that the cover disc always positions itself perpendicularly to the external force and transfers the pressure of the external force exactly in the direction of the center of the spherical segment-shaped sensor area 3.

The pre-load exerted by the springs 8 on the pressure-/voltage converter is metrologically permanently registered and represents a significant advantage of the system. If indeed the permitted tilt angle α is exceeded, for example due to the fact that the cover disc 6 is "leveraged" all the way on to the pressure/voltage converter 2 or the base disc 5, the measured force is reduced below the value of the pre-load. As a result faulty measurement conditions can be detected already during the data acquisition and be eliminated early in the process during the running measurement or the measurement can be interrupted and repeated.

In view of the above, it will be seen that the several objects of the invention are achieved and other advantageous results attained.

When introducing elements of the present invention or the preferred embodiments thereof, the articles "a", "an", "the" and "said" and the like are intended to mean that there are one or more of the elements. The terms "comprising", "including" and "having" and the like are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

The invention claimed is:

1. Compressive force measurement device with a pressure-/voltage converter in chip technology that features a spherical segment-shaped sensor area, characterized in that, the pressure-/voltage converter is disposed between a base disc and a cover disc, the base disc and the cover disc are tensioned against one another by means of springs, between the pressure-/voltage converter and the cover disc an adjustment disc is disposed, and the adjustment disc features a depression that is adapted to the spherical segment-shaped sensor area and that is in contact with the sensor area.

2. Compressive force measurement device according to claim 1, characterized in that the adjustment disc and the pressure-/voltage converter are displaceable relative to the base disc and to the cover disc.

3. Compressive force measurement device according to claim 2, characterized in that the base disc and the cover disc feature openings.

4. Compressive force measurement device according to claim 2, characterized in that, in the case of a ready-to-use compressive force measurement device, the adjustment disc is firmly connected with the cover disc and the pressure-/voltage converter is firmly connected with the base disc.

5. Compressive force measurement device according to claim 1, characterized in that the base disc and the cover disc feature openings.

6. Compressive force measurement device according to claim 5, characterized in that, in the case of a ready-to-use compressive force measurement device, the adjustment disc is firmly connected with the cover disc and the pressure-/voltage converter is firmly connected with the base disc.

7. Compressive force measurement device according to claim 5, characterized in that the springs are attached in equidistant spacings around the outer area of the base disc and the cover disc.

8. Compressive force measurement device according to claim 1, characterized in that, in the case of a ready-to-use compressive force measurement device, the adjustment disc is firmly connected with the cover disc and the pressure-/voltage converter is firmly connected with the base disc.

9. Compressive force measurement device according to claim 8, characterized in that the springs are attached in equidistant spacings around the outer area of the base disc and the cover disc.

10. Compressive force measurement device according to claim 1, characterized in that the springs are attached in equidistant spacings around the outer area of the base disc and the cover disc.

11. Compressive force measurement device according to claim 10, characterized in that four springs are present.

12. Compressive force measurement device according to the claim 11, characterized in that all springs have essentially the same pulling force.

13. Compressive force measurement device according to the claim 10, characterized in that all springs have essentially the same pulling force.

14. Compressive force measurement device according to claim 1, characterized in that electrical connections of the pressure-/voltage converter are guided laterally or through bore holes in the base plate to the outside by means of wire connections.

15. Compressive force measurement device according to claim 14, characterized in that electrical connections of the pressure-/voltage converter, which are guided outward in a downward direction through the base plate, are fixated in a holder, which encompasses the base plate, by means of adhesion, bayonet catch, screw connection, or compression.

16. Compressive force measurement device according to claim 1, characterized in that:
- the adjustment disc and the pressure-/voltage converter are displaceable relative to the base disc and to the cover disc;
- the base disc and the cover disc feature openings;
- the adjustment disc is firmly connected with the cover disc and the pressure-/voltage converter is firmly connected with the base disc;
- the springs are attached in equidistant spacings around the outer area of the base disc and the cover disc;
- four springs are present and all springs have essentially the same pulling force;
- electrical connections of the pressure-/voltage converter are guided laterally or through bore holes in the base plate to the outside by means of wire connections; and
- electrical connections of the pressure-/voltage converter, which are guided outward in a downward direction through the base plate, are fixated in a holder, which encompasses the base plate, by means of adhesion, bayonet catch, screw connection, or compression.

* * * * *